Feb. 13, 1968  G. D. CONLEE  3,368,412
VARIABLE THROW OSCILLATOR MECHANISM
Filed Aug. 2, 1965  6 Sheets-Sheet 2

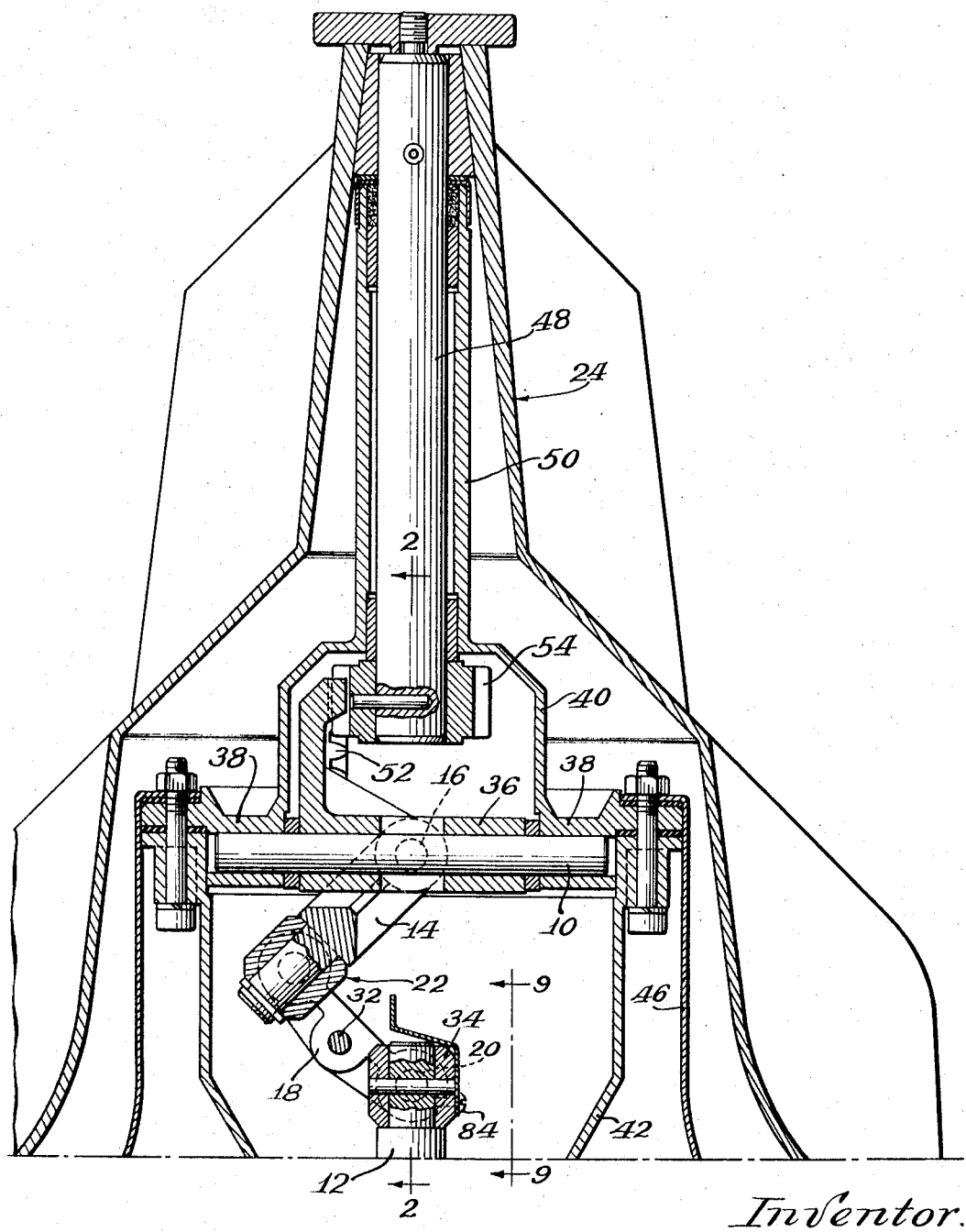

Inventor:
George D. Conlee
By Bair, Freeman & Molinare Attys.

Feb. 13, 1968

G. D. CONLEE 3,368,412

VARIABLE THROW OSCILLATOR MECHANISM

Filed Aug. 2, 1965

Inventor:
George D. Conlee
By Bair, Freeman & Molinare
Attys.

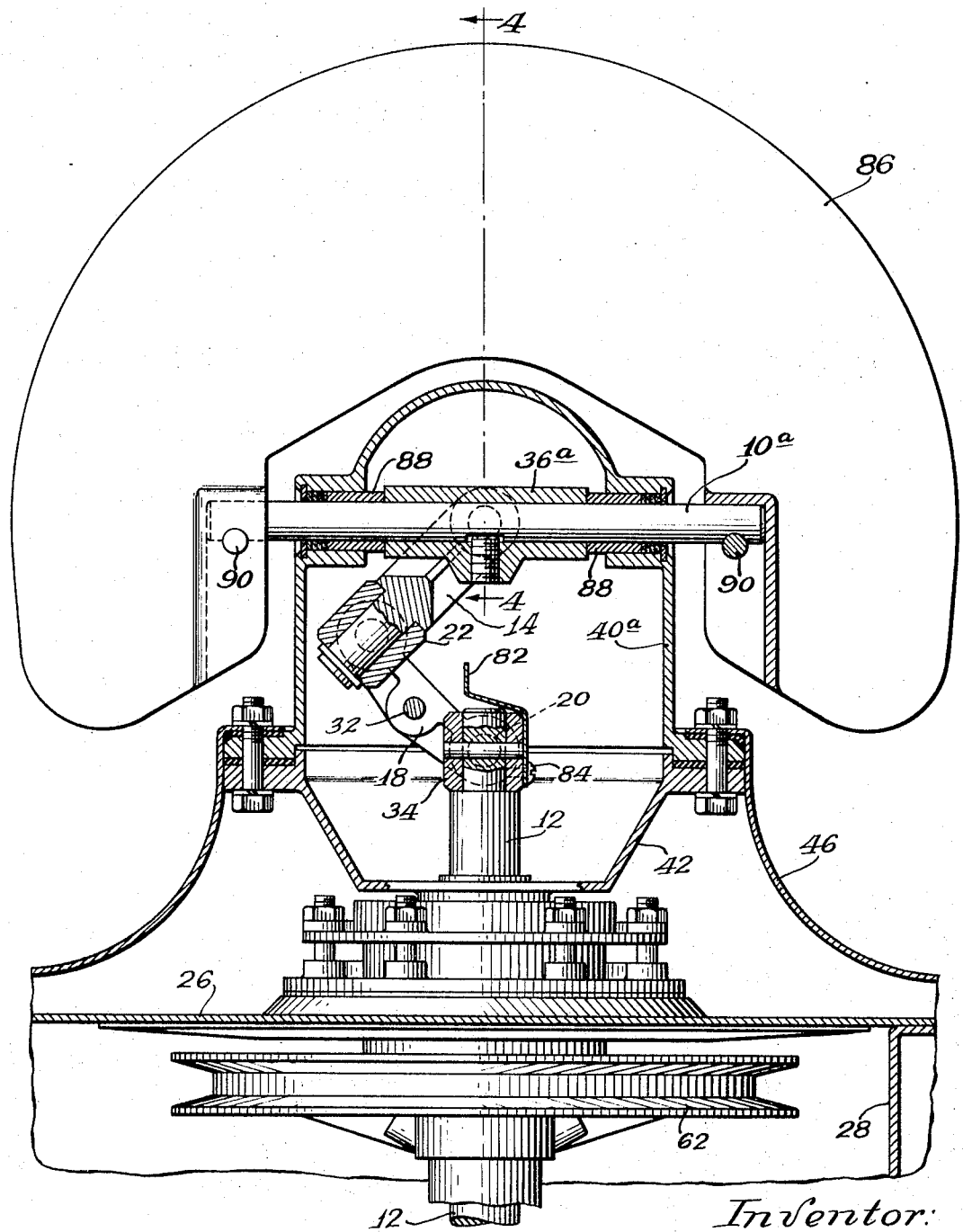

Feb. 13, 1968
G. D. CONLEE
3,368,412
VARIABLE THROW OSCILLATOR MECHANISM
Filed Aug. 2, 1965
6 Sheets-Sheet 5
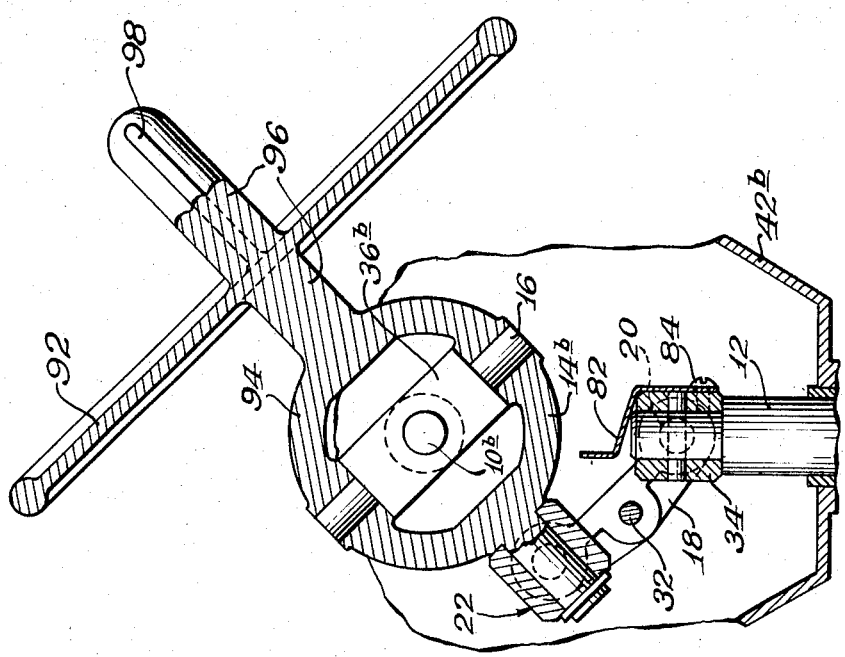
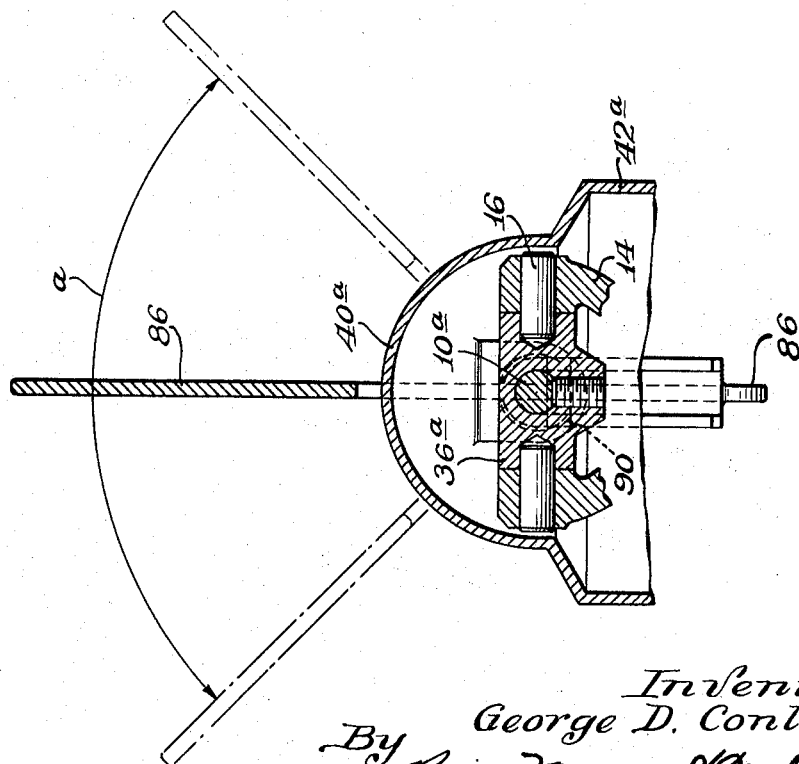
Inventor:
George D. Conlee
By Bair, Freeman & Molinare
Attys.

Feb. 13, 1968     G. D. CONLEE     3,368,412
VARIABLE THROW OSCILLATOR MECHANISM
Filed Aug. 2, 1965     6 Sheets-Sheet 6

Inventor:
George D. Conlee
By Bair, Freeman & Molinare, Attys.

3,368,412
VARIABLE THROW OSCILLATOR MECHANISM
George D. Conlee, 1416 W. 18th St.,
Cedar Falls, Iowa 50613
Filed Aug. 2, 1965, Ser. No. 476,585
16 Claims. (Cl. 74—42)

This invention relates to a variable throw oscillator mechanism which can be adapted to many uses such as for the agitator of a washing machine, for reciprocating sickle bars, and for reciprocating the saw blades of jig saws and the pistons or diaphragms of variable displacement pumps and the like.

One object of my present invention is to provide an oscillator mechanism involving a minimum number of parts and having means to adjust the throw of the oscillator in a stepless manner from zero to maximum and which adjustment can be accomplished while the oscillator mechanism is in operation.

Another object is to provide a variable throw oscillator mechanism which can be produced economically yet is rugged in construction so that it can be efficiently used for relatively heavy loads such as that imposed on a washing machine agitator, the mechanism being so designed as to have a relatively long service life.

More specificaly it is an object of my invention to provide a variable throw oscillator mechanism in which a driven shaft is driven from a drive shaft, the axes of which are substantially normal to each other, means being provided for converting rotation of the drive shaft into oscillations of the driven shaft comprising a driven arm having one end pivoted to the driven shaft on a pivot axis normal thereto, a drive arm having one end pivoted to the drive shaft on a pivot axis normal thereto, and a universal knuckle joint pivoting the other ends of the arms together whereby when the arms are at an angle to each other less than 180°, rotation of the drive shaft will cause the mean axis of the drive arm to describe a conical path in space and the driven arm to be oscillated thereby on its pivot to the driven shaft whereby the mean axis of the driven shaft also describes a conical path in space thus causing the pivot of the driven arm to be oscillated about the axis of the driven shaft and the driven shaft thereby oscillated, the driven shaft then being connected to any desirable oscillatory or reciprocatory device that is operated by oscillation of the driven shaft.

A further object is to provide a simple means for adjusting the degree of oscillation of the driven shaft in the form of a screwthreaded adjusting device coupled with the drive shaft to adjust it axially.

An additional object is to provide an oscillator mechanism which can be adjusted to a position wherein continued rotation of the drive shaft causes no oscillation of the driven shaft so that the mechanism can thus be adjusted to zero oscillation operation, and anywhere between zero and maximum, by the axial adjustment of the drive shaft.

Another additional object is to provide a variable throw oscillator mechanism wherein a washing machine agitator may be operatively connected with the driven shaft in a comparatively simple manner either directly or through bevel gears or the like so that the agitator may be in the form of a "waving vane" type or of the conventional oscillating type.

Still another additional object is to provide a variable oscillator mechanism which is readily adaptable to a spinner tub type of washing machine.

A further additional object is to provide an oscillator mechanism which is capable of driving an agitator nutationally, if desired, with the degree of nutation being adjustable and which mechanism is also adaptable for driving a pair of agitators, one nutationally and the other in waving vane fashion to provide additional turbulence in a liquid being agitated.

With these and other objects in view, my invention consists in the construction, arrangement and combination of the various parts of my variable throw oscillator mechanism, and in various forms thereof, whereby the objects above contemplated are attained, as hereinafter more fully set forth, pointed out in my claims and illustrated in detail on the accompanying drawings, wherein:

FIGS. 1 and 1A are a vertical sectional view through a variable throw oscillator mechanism showing one form of my invention applied to a washing machine agitator of the conventional type oscillated on a vertical axis and combined with a spinner-type washing machine tub, FIG. 1A being a continuation of the lower end of FIG. 1;

FIG. 3 is a sectional view similar to FIG. 1 showing a modification in the form of a waving vane agitator instead of the type shown in FIG. 1;

FIG. 4 is a sectional view on the line 4—4 of FIG. 3;

FIG. 5 is a sectional view similar to FIG. 1 showing another modified form of agitator, this one being a nutating disc-type;

Figure 1A:
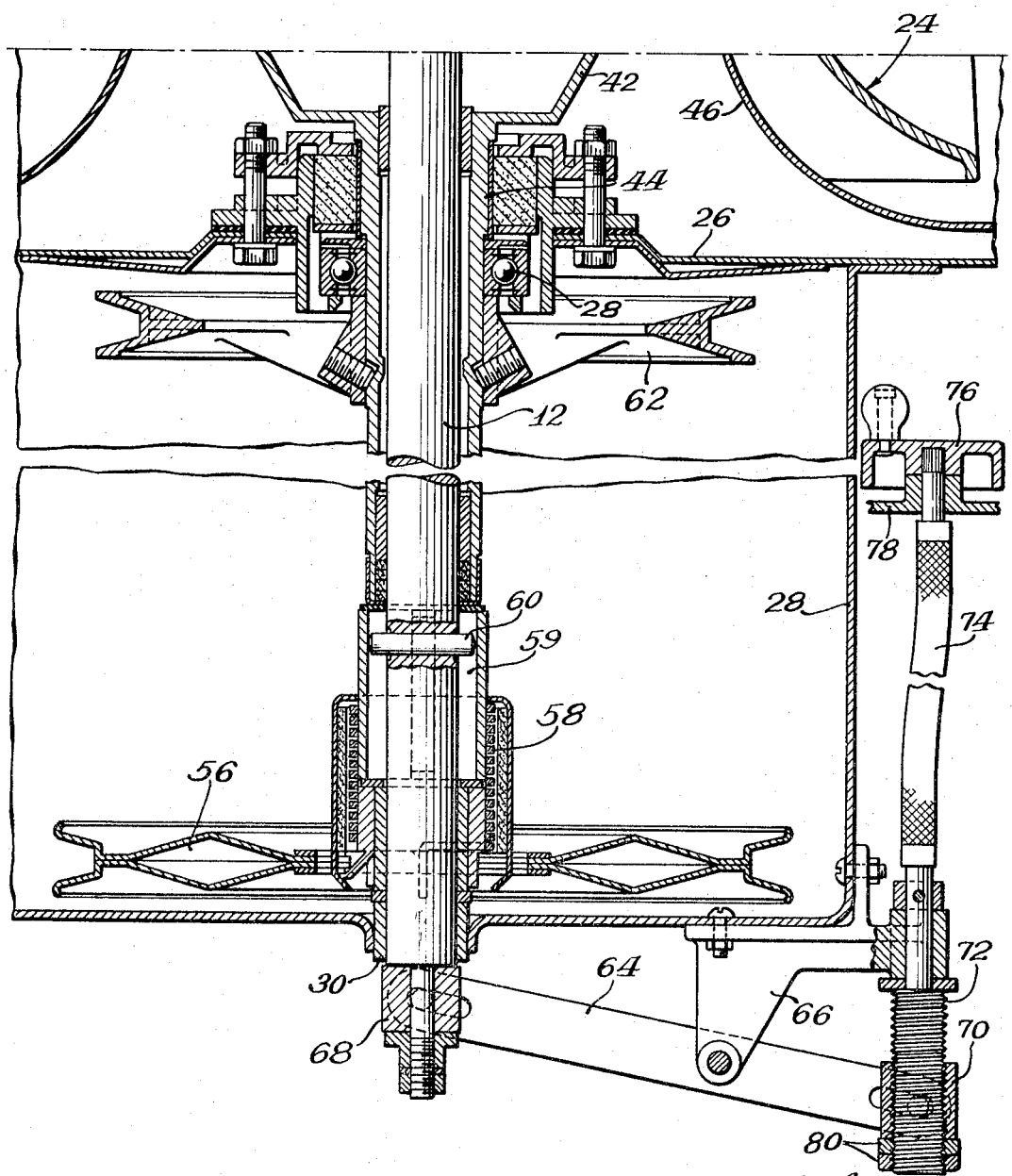
Figure 2:
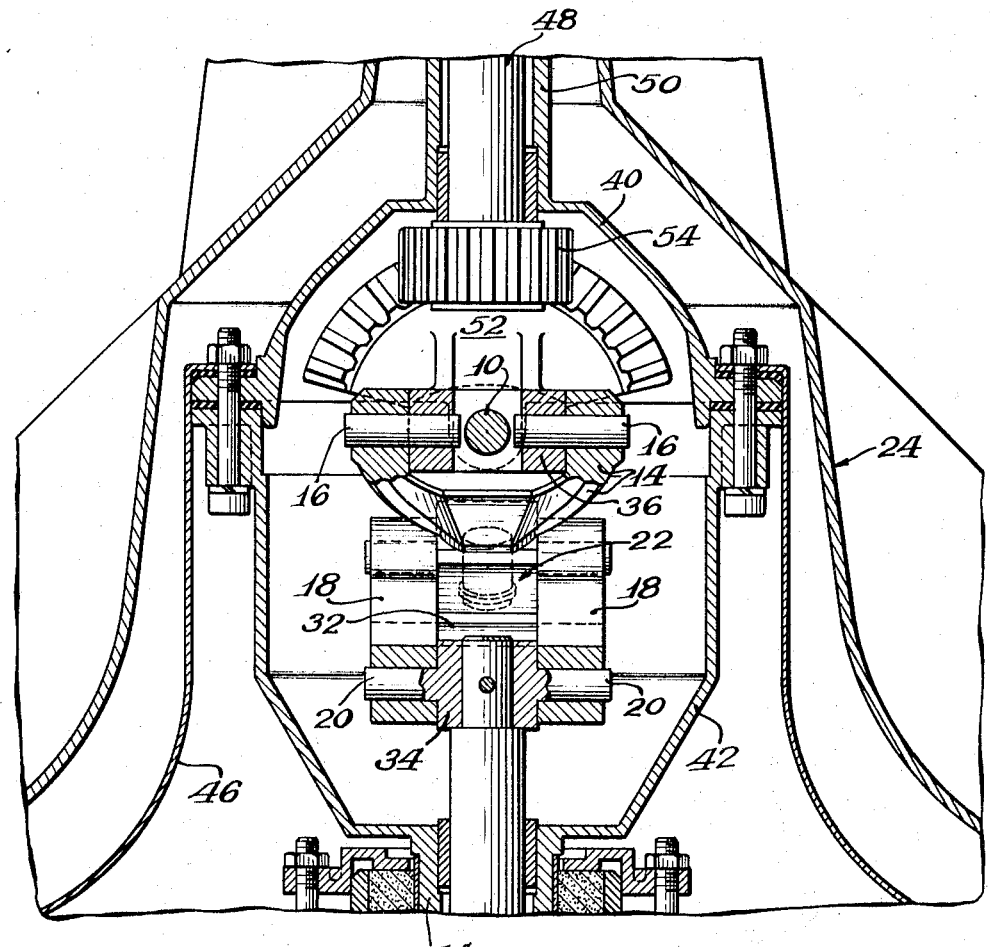
FIG. 2 is a vertical sectional view on the line 2—2 of FIG. 1.

On the accompanying drawings I have used in FIGS. 1, 1A and 2 the reference numeral 10 to indicate a driven shaft, 12 a drive shaft, 14 a driven arm and 18 a drive arm. The driven arm 14 is pivoted at 16 to the driven shaft 10 and the drive arm 18 is pivoted to the drive shaft 12 at 20 as shown in FIGS. 1 and 2. It will be noted the axes of the shafts 10 and 12 are substantially normal to each other. A universal knuckle joint 22 pivots the other ends of the arms 14 and 18 together. Accordingly, when the arms are at an angle to each other less than 180°, rotation of the drive shaft will cause the mean axis of the drive arm 18 which is shown diagrammatically at $18^x$ in FIG. 8 to describe a conical path in space indicated as $18^b$. The center of the joint 22 (the point where its two axes cross each other) will describe a circle in space indicated $22^y$. This will result in the mean axis $14^x$ of the driven arm to describe a conical path $14^y$ in space and the driven arm thereby oscillated on its pivot 16 which causes the pivot 16 to be oscillated about the axis of the driven shaft 10 and the driven shaft to thereby be oscillated.

Figure 8:
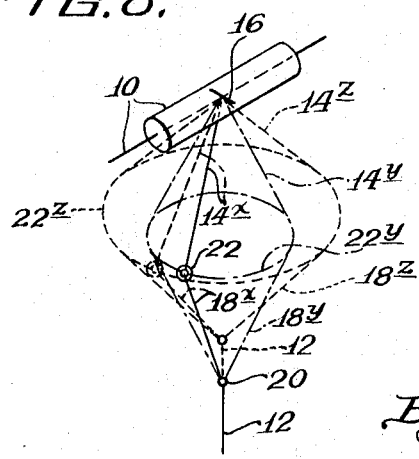
FIG. 8 is a geometrical diagram showing the action involved in the basic components of my variable throw oscillator mechanism at two differently adjusted positions.

If a greater degree of oscillation of the driven shaft 10 is desired, the drive shaft 12 may be moved axially upward as to the dotted position shown in FIG. 8 whereupon the mean axes $14^x$ and $18^x$ describe new conical paths $14^z$ and $18^z$, respectively, and the center of the universal knuckle joint 22 describes a larger circle indicated at $22^z$. Obviously therefore, axial adjustment of the drive shaft 12 may be utilized as a means to vary the throw of any mechanism connected to the driven shaft 10 and oscillated thereby.

Having described in connection with FIG. 8 the principle of operation of my variable throw oscillator mechanism I will now describe several practical forms which it may take.

FIGS. 1, 1A and 2 show my variable throw oscillator mechanism applied to a washing machine agitator of conventional type indicated generally at 24. The bottom 26 of a washing machine tub is shown in FIG. 1A with a housing 28 depending therefrom. Supported by the bottom 26 and the housing 28 are upper and lower bearings 28 and 30 for the drive shaft 12.

The drive arm 18 as shown in FIGS. 1 and 2 may be a pair of arms connected together by a pin 32 so that the lower ends of the arms stradle a head 34 on the upper end of the drive shaft 12 from which head the pivot pins 20 extend as shown in FIG. 2. The upper ends of the two arms straddle the universal knuckle joint 22 which is of the usual construction having a pair of pivots crossing at right angles to each other. The arm 14 may be in the form of a yoke as shown in FIGS. 1 and 2, the arms of which support separate pivot pins 16 as shown in FIG. 2 and which extend toward each other into opposite sides of a hub 36 mounted on the driven shaft 10. The shaft 10 has its ends located in bearings 38 of a housing cover 40 which in turn is mounted on a housing 42 provided with a depending sleeve 44 journaled in the bearing 28 as shown in FIG. 1A. The housing 42 and its cover 40 enclose the oscillator mechanism and support a spin tub 46 within the washing machine tub 26 which, of course, has the usual side wall (not shown) extending upwardly from the periphery of the bottom 26. Suitable gaskets and seals are provided as illustrated on the drawings but are not provided with reference numerals as such construction is usual in washing machines to prevent water and lubricant leakage.

In the form of invention shown in FIGS. 1, 1A and 2, the washing machine agitator 24 is mounted on an agitator shaft 48 arranged vertically in the usual manner and journaled in a tube 50 extending upwardly from the housing cover 40. An operative connection is provided between the agitator shaft 48 and the hub 36 in the form of a bevel gear segment 52 mounted on the hub and a bevel pinion 54 mounted on the lower end of the agitator shaft.

For driving the drive shaft 12 at a relatively low speed suitable for operating the washing machine agitator 24, I provide a pulley 56. The pulley 56 is operatively connected to the shaft 12 by an overrunning spring clutch 58 having a slot and pin connection 59–60 with the shaft 12 so that the pulley may remain at a predetermined axial position with respect to the washing machine but the shaft 12 may be axially moved relative to the pulley for oscillator throw adjustment yet the driving connection will be constantly maintained.

For driving the spin tube 46 at a relatively higher speed, a second pulley 62 is provided as shown in FIG. 1A secured to the sleeve 44. Thus, whenever the pulley 62 is rotated for spinning the tub 46, the agitator 24 and the shaft 12 will be rotated along with the spinning tub as permitted by release within the overrunning spring clutch 58.

For axially adjusting the drive shaft 12 and thereby varying the throw of my oscillator mechanism, screw-threaded means is preferable to provide for stepless adjustment between zero oscillation and maximum oscillation of the driven shaft 10. Such adjustment may take the form of an adjusting lever 64 pivoted intermediate its ends to a bracket 66 and having its opposite ends operatively connected by pin-and-slot means to a collar 68 on the shaft 12 and to an internally threaded collar 70. The collar 70 has a screw 72 threaded thereinto which is connected by a flexible shaft 74 to an adjusting knob that may be located at a convenient point of access such as on top 78 of the washing machine housing. A pair of lock nuts 80 mounted on the screw 72 serve to limit the downward movement of the collar 70 in the maximum oscillation adjustment position of the parts. The foregoing described arrangement is such that the input shaft, the agitator shaft, the collar 68, and the spin axis are all coaxial.

Figure 9:
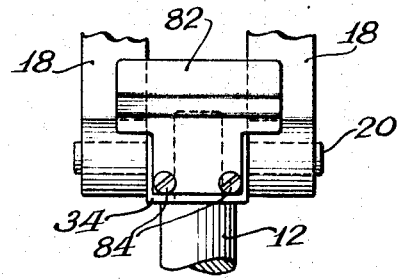
FIG. 9 is a detail side elevation of a portion of FIG. 1 as indicated by the line 9—9 thereon.

Referring again to FIG. 8, it will be obvious that if the drive shaft 12 is adjusted far enough downward, the mean axes 14$^x$ and 18$^x$ of the driven and drive arms will be brought into alignment with the axis of the shaft 12 at which time these mean axes are at 180° to each other. Thereupon the drive shaft may be rotated but will produce no oscillating movement of the driven shaft 10. Such adjustment is not needed in the driving of washing machine agitators but in some installations such as where the oscillations of the driven shaft 10 are utilized to operate a piston or diaphragm-type pump, it may be desirable to prevent operation of the pump while the drive shaft is still rotating, in which event such adjustment as just referred to can be made. Thereafter the adjustment may be changed for an increase of oscillation of the driven shaft 10 anywhere from zero up to maximum oscillation. There is a tendency, however, when 12, 18$^x$ and 14$^x$ are in axial alignment to stay in that position when an attempt is made to adjust the parts out of such position. FIGS. 3 and 9 illustrate bias producing means in the form of a leaf spring 82 secured as by screws 84 to the head 34 which will be engaged by the drive arm 18 as the arm approaches the aligned position (wherein the arms 14 and 18 are at 180° to each other) so that any time the mechanism is adjusted off the 180° position, the leaf spring will tend to move the arms in the proper direction instead of permitting them to go over center and become inoperable. The bias mechanism just described serves to automatically re-establish an angle less than 180° whenever the mechanism is adjusted away for zero oscillation position since the collar 68 has no force to do so. The spring 82 comes into use only as the 180° angle is approached.

Referring to FIGS. 3 and 4, a modified form of washing machine agitator (or agitator for liquids or for other use) is shown, the same being of the "waving vane" type for low cost production with many water disturbance creating possibilities. The vane is shown at 86. I have used the same reference numerals as in the previous figures except where parts are modified and bear the same reference numerals with the addition of the distinguishing characteristic $a$. In place of the bearings 38 of FIG. 1, sealed bearings 88 are provided so that the ends of the driven shaft 10$^a$ may be directly connected to the vane 86 as by pins 90. The waving vane action is depicted in FIG. 4 as oscillating according to the arrow $a$. This degree of oscillation is approximately maximum and can be shortened as desired by proper manipulation of the adjusting dial 76.

FIG. 5 shows a further modification in which an agitator 92 is mounted on a yoke-like extension 94 of the yoke-like driven arm 14$^b$ and may take the form of a disc surrounding a stud 96 projecting from the yoke 94. In FIG. 5 parts that are modified with relation to the previous figures bear the distinguishing characteristic $b$. Additionally, one or more vanes 98 may extend upwardly from the surface of the disc for greater agitating action. The mechanism of the device shown in FIG. 5 may be all mounted within a container for the liquid being agitated, or may be sealed off therefrom in any suitable manner such as suggested in the previous figures or with the use of flexible diaphragms or bellows (not shown). The disc 92 as well as the blades 98 will have a nutational movement imparted thereto by the yoke 94 as distinguished from an oscillating movement as provided for the waving vane 86 of FIGS. 3 and 4. This, of course, is due to the axis of the stud 96 also describing a cone path in space which would be complementary to the cone paths 14$^y$ and 14$^z$ of FIG. 8 by way of example.

It is also possible to provide still further agitating action for liquids and the like by combining the form of invention shown in FIGS. 3 and 4 with that shown in FIG. 5.

Figure 6:
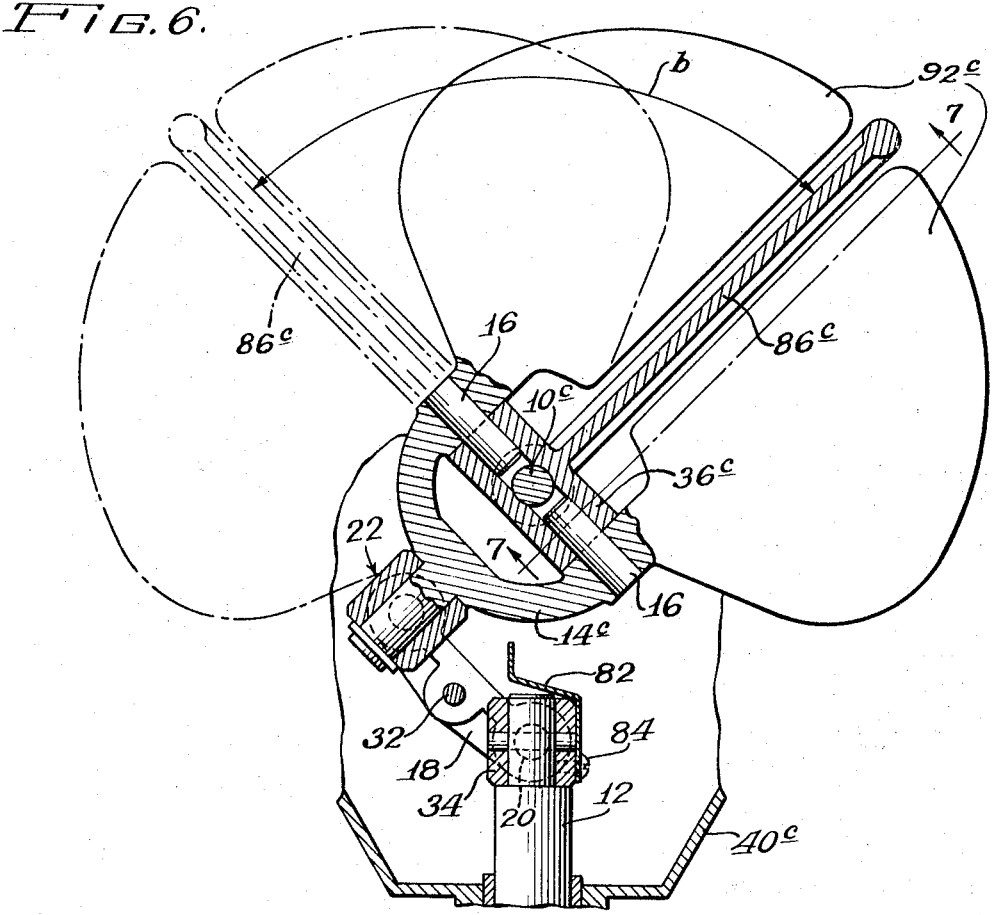
FIG. 6 is a sectional view similar to FIG. 1 showing still another modification wherein a nutational agitator and a waving vane agitator are combined in a single oscillator mechanism.
Figure 7:
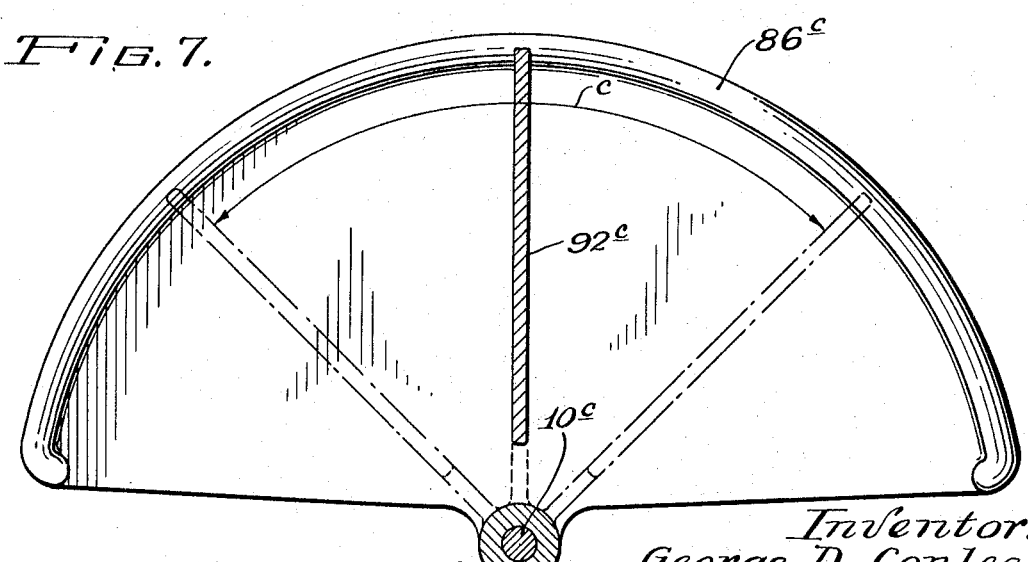
FIG. 7 is a sectional view on the line 7—7 of FIG. 6.

Such a construction produces compound or two-agitator action and is depicted in FIGS. 6 and 7 wherein the hub 36ᶜ is provided with a waving vane 86ᶜ and a nutating vane 92ᶜ is carried by the yoke 14ᶜ. In FIGS. 6 and 7 modified parts bear the distinguishing characteristic c. The vane 92ᶜ is split to straddle the vane 86ᶜ. Accordingly, the vane 86ᶜ will have merely a waving action (FIG. 6 arrow b) because of oscillating with the shaft 10ᶜ whereas the nutating vane 92ᶜ will have a waving action across the face of the vane 86ᶜ as depicted in FIG. 7, arrow c. This dual action of both vanes 86ᶜ and 92ᶜ working together produce a type of agitation for liquid and the like which is particularly efficient and thorough. The two vanes effect a complex motion capable of producing liquid currents at right angles to each other.

From the foregoing specification it will be obvious that I have provided a variable throw oscillator mechanism in which rotary motion of a drive shaft is converted to oscillating motion of a driven shaft and wherein a simple means is provided for adjusting the degree of oscillation of the driven shaft. The driven shaft can be used to operate many different types of devices which require oscillation, or which require reciprocation such as sickle bars, jig saw blades, variable displacement pumps and the like. Oscillating movement can be readily converted to reciprocation as well known in the mechanical art. The degree of oscillation and/or reciprocation can be infinitely adjusted between zero and maximum while the mechanism is in operation. The mechanism lends itself particularly to washing machine and liquid agitators, examples of which have been disclosed, and many varieties of power take-off attachments for operating various type of devices may be made to the oscillating shaft 10 or the nutating yoke 14 or both. Adjustment for throw is readily accomplished by screw means which sets and maintains axial position of the drive shaft. Also, adjustment can be accomplished with equal facility whether the mechanism is still or in motion.

Some changes may be made in the construction and arrangement of the parts of my variable throw oscillator without departing from the real spirit and purpose of my invention, and it is my intention to cover by my claims any modified forms of structure or use of mechanical equivalents which may reasonably be included within their scope.

I claim as my invention:

1. In a variable throw oscillator mechanism, a driven shaft, a drive shaft, the axes of said shafts being substantially normal to each other, and means for converting rotation of said drive shaft to oscillations of said driven shaft comprising a driven arm having one end pivoted to said driven shaft on a pivot axis normal to the axis thereof and with said axes intersecting each other, a drive arm having one end pivoted to said drive shaft on a pivot axis normal to the axis thereof and with said axes intersecting each other, a universal knuckle joint pivoting the other ends of said arms together whereby when said arms are at an angle to each other less than 180° rotation of said drive shaft will cause the mean axis of said drive arm to describe a conical path in space and said driven arm to be oscillated thereby on its pivot to said driven shaft whereby its mean axis describes a conical path in space, thus causing said last mentioned pivot to be oscillated about the axis of said driven shaft and said driven shaft thereby oscillated, the space between said first mentioned pivot axis of said driven arm and said first mentioned pivot axis of said drive arm being clear of any obstruction to permit said arms to be adjusted to an angle of 180° relative to each other to stop oscillation of said driven shaft while said drive shaft continues to rotate, and means to axially adjust said drive shaft to vary the angle between said arms and thereby the degree of oscillation of said driven shaft.

2. A variable throw oscillator mechanism according to claim 1 wherein said arms may be adjusted to an angle of 180° to each other whereupon said driven shaft and said driven arm remain stationary upon rotation of said drive shaft and said drive arm.

3. In a variable throw oscillator mechanism, a driven shaft, a drive shaft, the axes of said shafts being substantially normal to each other, and means for converting rotation of said drive shaft to oscillations of said driven shaft comprising a driven arm having one end pivoted to said driven shaft on a pivot axis normal thereto, a drive arm having one end pivoted to said drive shaft on a pivot axis normal thereto, a universal knuckle joint pivoting the other ends of said arms together whereby when said arms are at an angle to each other less than 180° rotation of said drive shaft will cause the mean axis of said drive arm to describe a conical path in space and said driven arm to be oscillated thereby on its pivot to said driven shaft whereby its mean axis describes a conical path in space, thus causing said last mentioned pivot to be oscillated about the axis of said driven shaft and said driven shaft thereby oscillated, means to axially adjust said drive shaft to vary the angle between said arms and thereby the degree of oscillation of said driven shaft, and means of coaction between said drive shaft and said drive arm to bias the arm toward an angle of less than 180°.

4. A variable throw oscillator mechanism according to claim 2 wherein said last mentioned means of claim 1 comprises a rotatable adjusting knob having a screw threaded connection with said drive shaft and a range of adjustment which permits adjusting said arms to an angle of 180° to each other.

5. In a variable throw oscillator mechanism, a driven shaft, a drive shaft, the axes of said shafts being substantially normal to each other, and means for converting rotation of said drive shaft to oscillations of said driven shaft comprising a driven arm having one end pivoted to said driven shaft on a pivot axis normal thereto, a drive arm having one end pivoted to said drive shaft on a pivot axis normal thereto, a universal knuckle joint pivoting the other ends of said arms together whereby when said arms are at an angle to each other less than 180° rotation of said drive shaft will cause the mean axis of said driven arm to describe a conical path in space and said driven arm to be oscillated thereby on its pivot to said driven shaft whereby its mean axis describes a conical path in space, thus causing said last mentioned pivot to be oscillated about the axis of said driven shaft and said driven shaft thereby oscillated, and means to axially adjust said drive shaft to vary the angle between said arms and thereby the degree of oscillation of said driven shaft, said last mentioned means comprising a pivoted lever having one portion operatively connected to said drive shaft to impart axial movement thereto, a rotatable adjusting knob, and a screw threaded connection between said adjusting knob and another portion of said lever.

6. In a variable throw oscillator mechanism, a driven shaft, a drive shaft, the axes of said shafts being substantially normal to each other, and means for converting rotation of said driven shaft to oscillations of said driven shaft comprising a driven arm having one end pivoted to said driven shaft on a pivot axis normal thereto, a drive arm having one end pivoted to said drive shaft on a pivot axis normal thereto, a universal knuckle joint pivoting the other ends of said arms together whereby when said arms are at an angle to each other less than 180° rotation of said drive shaft will cause the mean axis of said drive arm to describe a conical path in space and said driven arm to be oscillated thereby on its pivot to said driven shaft whereby its mean axis describes a conical path in space, thus causing said last mentioned pivot to be oscillated about the axis of said driven shaft and said driven shaft thereby oscillated, means to axially adjust said drive shaft to vary the angle between said arms and thereby the degree of oscillation of said driven shaft, and a washing machine agitator driven by said driven shaft, said washing machine agitator being oscillated on an axis coaxial with said drive shaft.

7. In a variable throw oscillator mechanism, a driven shaft, a drive shaft, the axes of said shafts being substantially normal to each other, and means for converting rotation of said drive shaft to oscillations of said driven shaft comprising a driven arm having one end pivoted to said driven shaft on a pivot axis normal thereto, a drive arm having one end pivoted to said drive shaft on a pivot axis normal thereto, a universal knuckle joint pivoting the other ends of said arms together whereby when said arms are at an angle to each other less than 180° rotation of said drive shaft will cause the mean axis of said drive arm to describe a conical path in space and said driven arm to be oscillated thereby on its pivot to said driven shaft whereby its mean axis describes a conical path in space, thus causing said last mentioned pivot to be oscillated about the axis of said driven shaft and said driven shaft and said driven shaft thereby oscillated, means to axially adjust said drive shaft to vary the angle between said arms and thereby the degree of oscillation of said driven shaft, a washing machine agitator driven by said driven shaft, a bevel gear sector mounted on said driven shaft for oscillation thereby, an agitator shaft arranged coaxially with said drive shaft, and a bevel pinion carried on said agitator shaft and meshing with said bevel gear sector, said washing machine agitator being mounted on said agitator shaft.

8. In a variable throw oscillator mechanism, a driven shaft, a drive shaft, the axes of said shafts being substantially normal to each other, and means for converting rotation of said drive shaft to oscillations of said driven shaft comprising a driven arm having one end pivoted to said driven shaft on a pivot axis normal thereto, a drive arm having one end pivoted to said drive shaft on a pivot axis normal thereto, a universal knuckle joint pivoting the other ends of said arms together whereby when said arms are at an angle to each other less than 180° rotation of said drive shaft will cause the mean axis of said drive arm to describe a conical path in space and said driven arm to be oscillated thereby on its pivot to said driven shaft whereby its mean axis describes a conical path in space, thus causing said last mentioned pivot to be oscillated about the axis of said driven shaft and said driven shaft thereby oscillated, means to axially adjust said drive shaft to vary the angle between said arms and thereby the degree of oscillation of said driven shaft, a washing machine agitator driven by said driven shaft, and said washing machine agitator comprising a vane mounted on said driven shaft to be oscillated with said driven shaft.

9. A variable throw oscillator mechanism according to claim 8 wherein a housing is provided for said oscillator mechanism, the ends of said driven shaft project therefrom and said vane extends over said housing and has ends mounted on the ends of said drive shaft.

10. In a variable throw oscillator mechanism, a driven shaft, a drive shaft, the axis of said shafts being substantially normal to each other, and means for converting rotation of said drive shaft to oscillations of said driven shaft comprising a driven arm having one end pivoted to said driven shaft on a pivot axis normal thereto, a drive arm having one end pivoted to said drive shaft on a pivot axis normal thereto, a universal knuckle joint pivoting the other ends of said arms together whereby when said arms are at an angle to each other less than 180° rotation of said drive shaft will cause the mean axis of said drive arm to describe a conical path in space and said driven arm to be oscillated thereby on its pivot to said driven shaft whereby its mean axis describes a conical path in space, thus causing said last mentioned pivot to be oscillated about the axis of said driven shaft and said driven shaft thereby oscillated, and means to axially adjust said drive shaft to vary the angle between said arms and thereby the degree of oscillation of said driven shaft, and means to axially adjust said drive shaft to vary the angle between said arms and thereby the degree of oscillation of said driven shaft, and mechanism including a housing for the foregoing elements, means for mounting said housing for rotation about the axis of said drive shaft, a washing machine spinner tub carried by said housing, a washing machine agitator mounted in said spinner tub and operatively connected with said driven shaft for oscillation thereby, and means to rotate said housing to thereby spin said spinner tub.

11. A variable throw oscillator mechanism according to claim 10 wherein said operative connection comprises an agitator shaft coaxial with said drive shaft, and means of connection from said driven shaft to said agitator shaft to oscillate the latter from the former.

12. A variable throw oscillator mechanism according to claim 10 wherein said operative connection comprises an agitator shaft coaxial with said drive shaft, and a bevel gear drive connection is provided from said driven shaft to said agitator shaft.

13. A variable throw oscillator mechanism according to claim 10 wherein said washing machine agitator comprises a vane mounted on said driven shaft to be oscillated thereby.

14. A variable throw oscillator mechanism according to claim 13 wherein a housing is provided for said oscillator mechanism, the ends of said drive shaft project therefrom and said vane extends over said housing and has ends mounted on the ends of said drive shaft.

15. In a variable throw oscillator mechanism, a driven shaft, a drive shaft, the axes of said shafts being substantially normal to each other, and means for converting rotation of said drive shaft to oscillations of said driven shaft comprising a driven arm having one end pivoted to said driven shaft on a pivot axis normal thereto, a drive arm having one end pivoted to said drive shaft on a pivot axis normal thereto, a universal knuckle joint pivoting the other ends of said arms together whereby when said arms are at an angle to each other less than 180° rotation of said drive shaft will cause the mean axis of said drive arm to describe a conical path in space and said driven arm to be oscillated thereby on its pivot to said driven shaft whereby its mean axis describes a conical path in space, thus causing said last mentioned pivot to be oscillated about the axis of said driven shaft and said driven shaft thereby oscillated, means to axially adjust said drive shaft to vary the angle between said arms and thereby the degree of oscillation of said driven shaft, and a washing machine agitator driven by said driven shaft and mounted on said driven arm to be oscillated with both said driven arm and said driven shaft whereby its movement is nutational.

16. In a variable throw oscillator mechanism, a driven shaft, a drive shaft, the axes of said shafts being substantially normal to each other, and means for converting rotation of said drive shaft to oscillations of said driven shaft comprising a driven arm having one end pivoted to said driven shaft on a pivot axis normal thereto, a drive arm having one end pivoted to said drive shaft on a pivot axis normal thereto, a universal knuckle joint pivoting the other ends of said arms together whereby when said arms are at an angle to each other less than 180° rotation of said drive shaft will cause the mean axis of said drive arm to describe a conical path in space and said driven arm to be oscillated thereby on its pivot to said driven shaft whereby its mean axis describes a conical path in space, thus causing said last mentioned pivot to be oscillated about the axis of said driven shaft and said driven shaft thereby oscillated, means to axially adjust said drive shaft to vary the angle between said arms and thereby the degree of oscillation of said driven shaft, and a washing machine agitator driven by said driven shaft and comprising a first vane mounted on said driven shaft to be oscillated with said driven arm and a second vane mounted on said driven arm to be oscillated with both said driven arm and said driven shaft.

References Cited

UNITED STATES PATENTS

| | | | |
|---|---|---|---|
| 1,519,715 | 12/1924 | Altorfer | 74—86 |
| 2,332,383 | 10/1943 | Kost | 74—75 |
| 2,527,556 | 10/1950 | Kost | 74—86 |
| 2,621,907 | 12/1952 | Maurer et al. | 74—86 |
| 2,695,510 | 11/1954 | Clark | 74—86 |
| 2,974,542 | 3/1961 | Sisson et al. | 74—75 |

FRED C. MATTERN, Jr., *Primary Examiner.*

C. J. HUSAR, *Assistant Examiner.*